(12) United States Patent
Tada et al.

(10) Patent No.: US 8,027,234 B2
(45) Date of Patent: Sep. 27, 2011

(54) INFORMATION RECORD CONTROLLING APPARATUS, INFORMATION RECORD CONTROLLING METHOD, INFORMATION REPRODUCTION CONTROLLING APPARATUS, INFORMATION REPRODUCTION CONTROLLING METHOD, INFORMATION RECORDING MEDIUM, INFORMATION RECORD CONTROLLING PROGRAM, AND INFORMATION REPRODUCTION CONTROLLING PROGRAM

(75) Inventors: Kenichiro Tada, Tokorozawa (JP); Toshio Suzuki, Tokorozawa (JP); Kyoichi Terao, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1290 days.

(21) Appl. No.: 11/631,966

(22) PCT Filed: Jul. 4, 2005

(86) PCT No.: PCT/JP2005/012353
§ 371 (c)(1), (2), (4) Date: Jan. 9, 2007

(87) PCT Pub. No.: WO2006/008952
PCT Pub. Date: Jan. 26, 2006

(65) Prior Publication Data
US 2007/0237045 A1 Oct. 11, 2007

(30) Foreign Application Priority Data

Jul. 16, 2004 (JP) .................. P2004-210634

(51) Int. Cl.
*G11B 27/22* (2006.01)
*H04N 7/167* (2011.01)
(52) U.S. Cl. .............. 369/47.36; 380/201; 380/203
(58) Field of Classification Search ........... 369/47.36; 348/E5.002, E7.056; 380/201, 203; 386/E5.004
See application file for complete search history.

(56) References Cited

U.S. PATENT DOCUMENTS
2002/0114462 A1* 8/2002 Kudo et al. .............. 380/203

FOREIGN PATENT DOCUMENTS
| JP | 11-259964 | 9/1999 |
| JP | 2002-183974 | 6/2002 |
| JP | 2002-244926 | 8/2002 |
| JP | 2003-101529 | 4/2003 |
| JP | 2004-171714 | 6/2004 |

* cited by examiner

*Primary Examiner* — Thai Tran
*Assistant Examiner* — Syed Hasan
(74) *Attorney, Agent, or Firm* — Drinker Biddle & Reath LLP

(57) ABSTRACT

To provide an information record controlling apparatus which can move and record recorded information more efficiently, and more efficiently administrate move and record. In the information recording and reproducing apparatus 1, CPU 2 administrates and controls recorded information, which is constituted by a plurality of information units. Further, the CPU 2 controls move and record of the recorded information, which are carried out with respect to each of the information units, on the basis of reproduction able and disable information with respect to each of the information units.

9 Claims, 14 Drawing Sheets

ADMINISTRATION TABLE T4 (MEMORY)

| ORDER | ANCILLARY INFORMATION |
|---|---|
| 1 | FFFFFFFF |
| 2 | b |
| : | : |
| X | x |

ADMINISTRATION TABLE T5 (MEMORY)

| ORDER | ANCILLARY INFORMATION |
|---|---|
| 1 | a |

FIG. 18

ADMINISTRATION TABLE T4 (MEMORY)

| ORDER | ANCILLARY INFORMATION |
|---|---|
| 1 | FFFFFFFF |
| 2 | FFFFFFFF |
| : | : |
| X | x |

ADMINISTRATION TABLE T5 (MEMORY)

| ORDER | ANCILLARY INFORMATION |
|---|---|
| 1 | a |
| 2 | b |

FIG. 19

ADMINISTRATION TABLE T4 (MEMORY)

| ORDER | ANCILLARY INFORMATION |
|---|---|
| 1 | FFFFFFFF |
| 2 | FFFFFFFF |
| : | : |
| X | FFFFFFFF |

ADMINISTRATION TABLE T5 (MEMORY)

| ORDER | ANCILLARY INFORMATION |
|---|---|
| 1 | a |
| 2 | b |
| : | : |
| X | x |

# INFORMATION RECORD CONTROLLING APPARATUS, INFORMATION RECORD CONTROLLING METHOD, INFORMATION REPRODUCTION CONTROLLING APPARATUS, INFORMATION REPRODUCTION CONTROLLING METHOD, INFORMATION RECORDING MEDIUM, INFORMATION RECORD CONTROLLING PROGRAM, AND INFORMATION REPRODUCTION CONTROLLING PROGRAM

FIELD OF THE INVENTION

The present invention relates to a technical field of an information record controlling apparatus and an information record controlling method for moving and recording recorded information, constituted by information units, among information recording mediums, an information reproduction controlling apparatus and an information reproduction controlling method for reproducing the recorded information thus recorded, and so on.

BACKGROUND OF THE INVENTION

Digital information (for example, image information, sound information, and character information), broadcasted in present digital broadcasting, has information indicative of restriction of copy, as described in Non Patent Document 1. Accordingly, for example, when such the digital information received by a certain receiving apparatus is once recorded onto a recording medium, it becomes impossible to copy the recording medium to another recording medium. Therefore, when the digital information thus recorded (hereinafter referred to as "recorded information") is to be recorded onto another recording medium, it is necessary that the recorded information is not recorded from the recording medium to the other recording medium but moved and recorded (moved to record). In this, what meant by "moved and recorded" is that the recorded information is moved from an information recording medium to another information recording medium, and after it is moved, the recorded information is in a state that the recorded information cannot be reproduced from the former recording medium.
Non Patent Document 1: Incorporated Company, The Association for Promotion of Digital Broadcasting, "As to Copy Control", Internet <URL:http://www.d-pa.org/copyctr/index.html>

DISCLOSURE OF THE INVENTION

Problems to be Solved by the Invention

However, according to stipulation of ARIB (Incorporated Company, Association of Radio Industries and Businesses), such the move and record shall satisfy a condition that an identical recorded information does not exist in two recording mediums for one minute or more. In other words, when recorded information is moved from a recording medium to another recording medium, it is necessary that the recorded information, is recorded from the recording medium to the another recording medium, and the recorded information recorded in the another recording medium is restricted from being reproduced by the recording medium by rendering the recorded information in a state of disabling the reproduction.

The present invention is provided in consideration of the above various situations, and an example of the object of present invention is to provide an information record controlling device and an information record controlling method that can further efficiently move and record the recorded information and further efficiently control the move and record, an information reproduction controlling device and an information reproduction controlling method that can properly reproduce the recorded information which is recorded by the move and record, and so on.

Means for Solving the Problems

To solve the above problems according to the invention, there is provided an information record controlling apparatus that administrates and controls recorded information constituted by a plurality of information units, the information record controlling apparatus including:

a control means for controlling move and record of the recorded information with respect to each of the information units on the basis of reproduction able and disable information, which stipulates whether or not reproduction is possible with respect to each of the information units.

In order to solve the above problem, according to invention, there is provided an information reproduction controlling apparatus that administrates and controls recorded information, constituted by a plurality of information units, and controls reproduction of the recorded information, carried out with respect to each of the information units on the basis of reproduction able and disable information which stipulates whether or not reproduction is possible with respect to each of the information units, including:

a discrimination means for referring to the reproduction enable and disable information when the recorded information, recorded on the first recording medium, is reproduced, and discriminating whether or not the information units can be reproduced from a first recording medium with respect to each of the information units; and a reproduction controlling means for obtaining and reproducing the information units when it is discriminated that the reproduction is possible.

In order to solve the above problem, an invention, is provided with a recorded information region for recording recorded information constituted by a plurality of information units, and an administration information region for recording reproduction able and disable information, which stipulates whether or not the reproduction is possible with respect to each of the information units.

In order to solve the above problem, according to invention, there is provided an information record controlling method for controlling and administrating recorded information, constituted by a plurality of information units, and controlling move and record of the recorded information with respect to each of the information units on the basis of reproduction able and disable information for stipulating whether or not reproduction is possible with respect to each of the information units, including:

a move controlling step of obtaining the recorded information, recorded on a first recording medium, with respect to each of the information units, and making the recorded information record on a second recording medium with respect to each of the information units; and a reproduction disable setting step for setting up information, indicating that the information unit cannot be reproduced from the first recording medium, with respect to each of the information units of the recorded information of the second recording medium.

In order to solve the above problem, according to invention, there is provided a reproduction controlling method for administrating and controlling recorded information, constituted by a plurality of information units, and controlling reproduction of the recorded information, carried out with respect to each of the information units on the basis of reproduction able and disable information for stipulating whether or not reproduction is possible with respect to each of the information units, including:

a discrimination step of referring to the reproduction able and disable information when the recorded information, recorded on a first recording medium is reproduced, and discriminating whether or not the information unit can be reproduced from the first recording medium with respect to each of the information units; and a reproduction control step of obtaining and reproducing the information units when it is discriminated by the discrimination means that the reproduction is possible.

In order to solve the above problem, an invention is characterized to cause a recording computer, included in an information record controlling apparatus which administrates and controls recorded information, constituted by a plurality of information units, and controls move and copy of the recorded information, carried out with respect to each of information units, on the basis of reproduction able and disable information for stipulating whether or not reproduction is possible with respect to each of the information units, to function as:

a move controlling means for reproducing the recorded information, recorded on a first recording medium, and making the recorded information record on a second recording medium, and a reproduction disable setting means for setting up information indicating that the information unit cannot be reproduced from the first recording medium with respect to each of the information units of the recorded information, recorded on the second recording medium.

In order to solve the above problem, an invention is characterized to cause a reproducing computer, included in a reproduction controlling apparatus which administrates and controls recorded information, constituted by a plurality of information units, and controls reproduction of the recorded information, carried out with respect to each of information units, on the basis of reproduction able and disable information for stipulating whether or not reproduction is possible with respect to each of the information units, to function as:

a discrimination means for referring to the reproduction able and disable information when the recorded information, recorded on a first recording medium, is reproduced, and discriminating whether or not the information unit can be reproduced from the first recording medium with respect to each of the information units; and a reproduction controlling means for obtaining and reproducing the information units when it is discriminated that the reproduction is possible by the discrimination means.

BRIEF DESCRIPTION OF THE DRAWINGS

FIG. 10 An explanatory view for showing another modified example of administration information in an administration table.

FIG. 17 An explanatory view for showing operation of a modified example of administration table.

FIG. 18 An explanatory view for showing operation of a modified example of administration table.

FIG. 19 An explanatory view for showing operation of a modified example of administration table.

EXPLANATION OF NUMERICAL REFERENCE

1: Information Recording and Reproducing Apparatus
2: CPU
3: Memory
5: Display Unit
A: Recording Medium
B: Recording Medium

PREFERRED EMBODIMENTS FOR CARRYING OUT THE INVENTION

Hereinafter, embodiments of the present invention will be described in reference of drawings.

The embodiments to be described below are about a case where the present invention is applied to an information recording and reproducing apparatus, enabled to record AV (Audio Visual) information, which is distributed in digital broadcasting represented such as by BS (Broadcast Satellite) digital broadcasting, onto an information recording medium such as iVDR (information on Versatile Disc for Removable Usage) and also is enabled to carry out reproduction process of the AV information.

In the following explanation, the AV information is broadcasted in conformity with transport stream standard in MPEG2 (Moving Picture Expert Group 2), which is well known as a standard related to a compression technique of video.

Furthermore, in the following embodiment, a case where iVDR recording the above AV information is applied to the recording medium A, and blue ray disc, D-VHS, DVD-RW (Digital Versatile Disc-Re-Recordable) or the like is applied to the recording medium B is illustrated.

(I) Construction for Information Recording and Reproducing Apparatus

Figure 1:
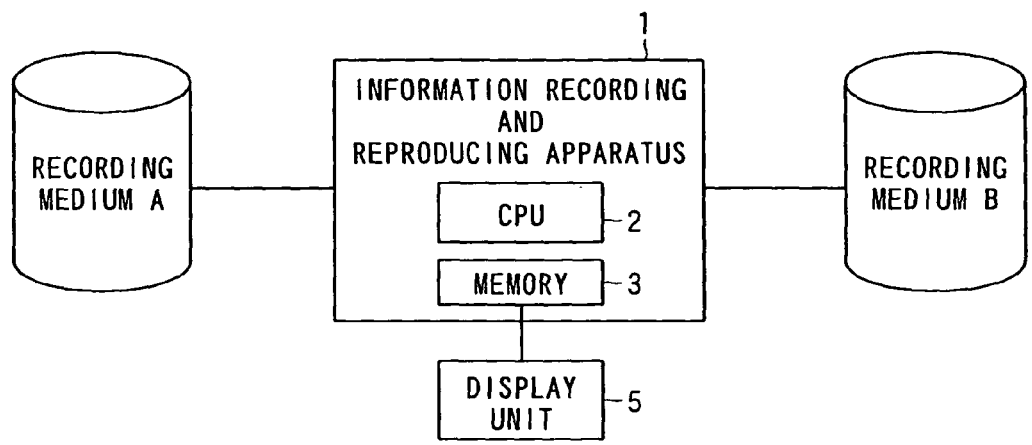
FIG. 1 A block chart for showing a structure of information recording and reproducing apparatus according town embodiment of the present invention.
Figure 2:
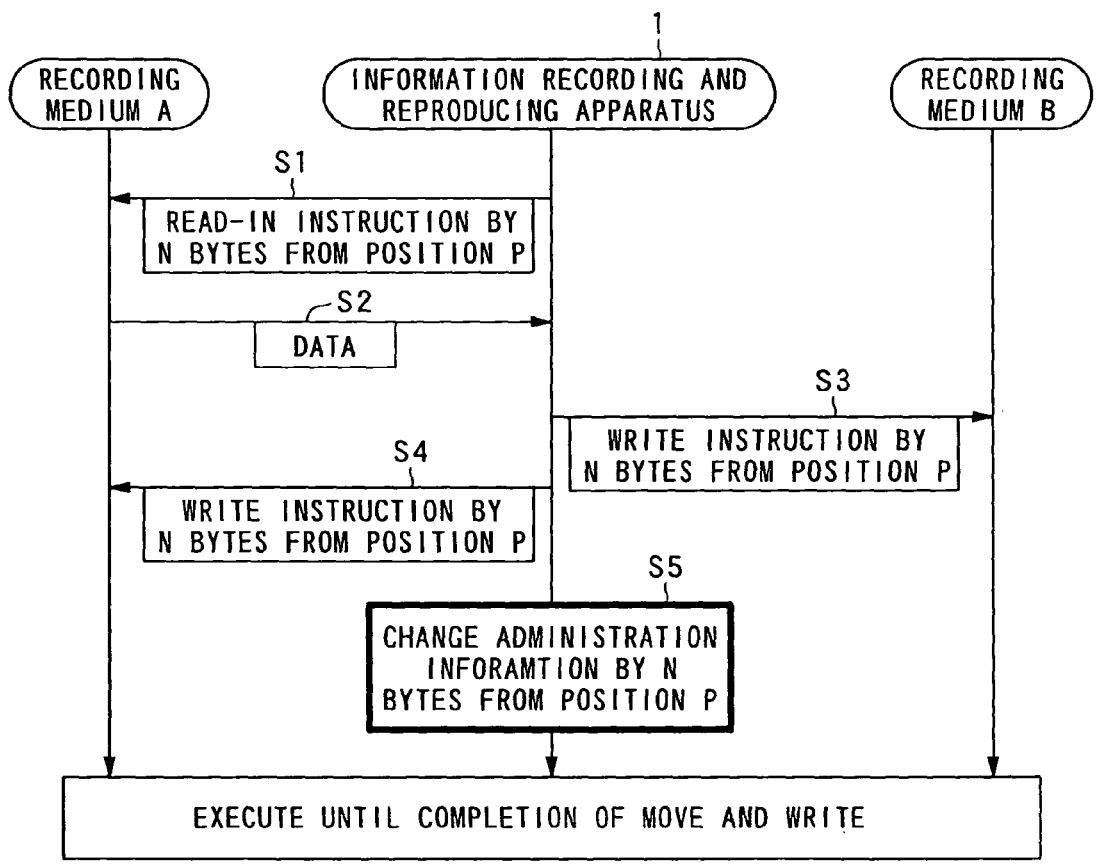
FIG. 2 A flow chart for showing operation of an information recording and reproducing apparatus with respect to recording mediums according to an embodiment of the present invention.

FIG. 1 is a block chart for showing a structure of information recording and reproducing apparatus according to the embodiment. FIG. 2 is a flowchart for showing operations of the information recording and reproducing apparatus with respect to the recording mediums A and B.

As shown in FIG. 1, the information recording and reproducing apparatus 1 has a CPU 2 and a memory 3, and provided with a display unit 5. Further, to the information recording and reproducing apparatus 1, a recording medium A as a first recording medium and a recording medium B as a second recording medium are connected. Further, the recording medium A has MPEG-TS (Transport Stream) (hereinafter referred to as stream TS), inputted from a digital broadcasting receiving circuit (not shown), recorded on it in advance. A case where MPEG-TS is moved from the recording medium A and recorded onto the recording medium B is exemplified. In this embodiment, the MPEG-TS constitutes the recorded information of the present invention.

The information recording and reproducing apparatus 1 controls move and record and reproduction of the stream TS from the recording medium A to the recording medium B using information units having a fixed length, which are obtained by dividing into units of byte number N.

Specifically, the CPU 2 respectively forms a move controlling means for reproducing stream TS recorded on a recording medium A, and move to record on a recording medium B; a reproduction denial setting means for changing and setting up a reproduction able flag F, indicating that information unit cannot be reproduced from the recording medium A with respect to each of the information units of the stream TS which has been moved and recorded on the recording medium B; a reproduction able setting means for setting up a flag, indicating that the stream TS, moved and recorded from the recording medium B, can be reproduced from the recording medium B; and a reproduction able and disable information generating means for generating an administration table T including a reproduction able flags F with respect to information units of the stream TS, which is moved and recorded onto the recording medium B.

Further, the CPU 2 respectively forms a discriminating means which refers to reproduction able flags F corresponding to each of the information units in reproducing the information units of the stream TS, which is recorded on the recording medium A, and discriminates whether or not each of the information units can be reproduced from the recording medium A, and a reproduction controlling means which reproduces each of the information units when it is determined that reproduction is possible.

The display unit 5 displays issues that the move and record of the stream TS are stopped in mid-course and the stream TS which is moved and recorded cannot be reproduced.

Figure 3:
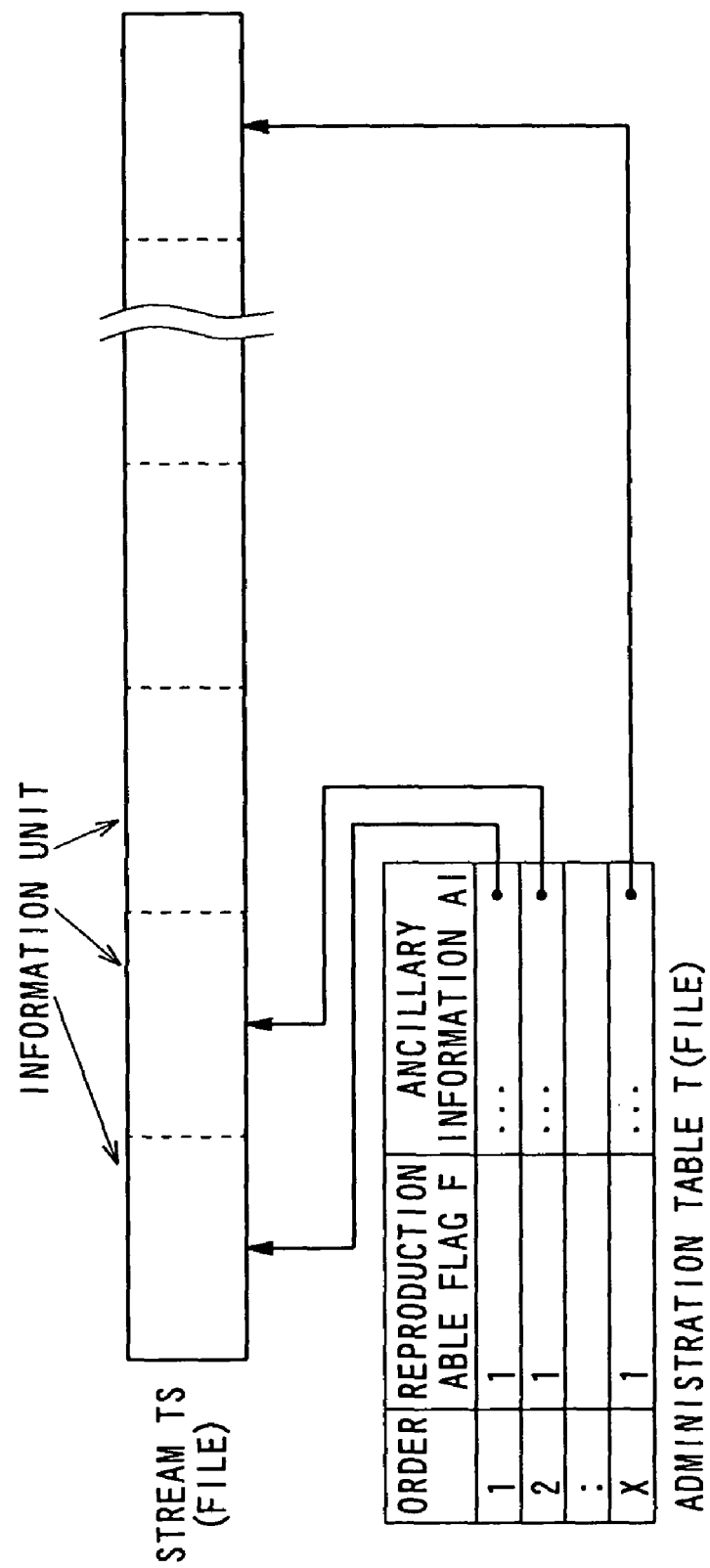
FIG. 3 An explanatory view for showing a stream and an administration table according to an embodiment of the present invention.

One stream TS is made up of a plurality of information units as shown in FIG. 3. One information unit is made up of a plurality of TS packets (not shown). In this embodiment, the stream TS is made up of information units as many as X. Further, the information unit in the embodiment has a data length of N (byte), being an integral multiple (m times) of a predetermined byte number of TS packets. Accordingly, a data length of the stream TS shown in FIG. 3 is N×X bytes.

Further, the administration table T has, with respect to each of the information units, an order of each of the information units in the stream TS (an item indicated as "order" in FIG. 3), a reproduction able flag F as the reproduction able and disable information for stipulating whether or not the reproduction is possible, and ancillary information AI indicative of characteristics of the stream TS. As the ancillary information AI, reproduction starting times respectively of the information units are recorded. In FIG. 3, when the reproduction able flag F has a value of "1", the information unit thereof can be reproduced. When the value is "0", the information unit thereof cannot be reproduced.

The administration table T is produced by the CPU 2 when the stream TS is newly recorded onto the recording medium, and recorded as a file in association with the stream TS thus recorded onto the recording medium as administration information of the stream TS thus recorded. The administration table T is read in from the recording medium, and recorded onto a memory 3 of the information recording and reproducing apparatus 1 and referred to by the CPU 2 of the information recording and reproducing apparatus 1 when the CPU 2 operates the stream TS to be processed. The administration table T is recorded as a file onto the recording medium when the CPU 2 of the information recording and reproducing apparatus 1 finishes to record the stream TS to be processed to the recording medium.

A detail is described below. For example, when the stream TS is newly moved from the recording medium A to the recording medium B, the administration table T associated with the stream TS to be moved is read in. When the stream TS is recorded on the recording medium B, a new administration table T to be recorded onto the recording medium B is newly produced, and recorded onto the recording medium when the move is finished. Provided that the stream TS is moved in mid-course from the recording medium A to the recording medium B, and the remaining stream TS recorded on the recording medium A is moved again, since the administration table T is already produced on the recording medium B, the administration table T on the recording medium B is again read in, and the reproduction flag F or the like concerning the information units, which are continuously moved, is recorded on the recording medium B.

(II) Operation of the Information Recording and Reproducing Apparatus

Next, operation of move and record in the information recording and reproducing apparatus 1 is schematically described in reference of a flow chart shown in FIG. 2. Hereinafter, explanation of the operation of the information recording and reproducing apparatus is under assumption that the administration table T is recorded by the CPU 2 onto the memory 3 from the recording medium A and the recording medium B before the process shown in the flow chart takes place.

First, when the CPU 2 of the information recording and reproducing apparatus 1 carries out a read-out instruction of one information unit in the stream TS corresponding to a position P (address information in units of byte), which indicates a designated move starting position, with respect to the recording medium A in Step S1. Then the information recording medium A outputs the information unit (data) corresponding to the position P to the information recording and reproducing apparatus 1 (Step 2).

Next, the information recording and reproducing apparatus 1 carries out a write instruction of the information unit from the position P to the recording medium B in Step S3. Further, a write instruction of N bytes from the position P of the recording medium B is carried out in Step S4, namely, deletion of N bytes from the position P (including a process of replacing one information unit with a data row having no meaning, and a process of replacing a part of one information unit with a specific data row).

Furthermore, the information recording and reproducing apparatus 1 changes a value of reproduction able flag F in the administration table T so that the one information unit corresponding to the position P is in a state of disabling reproduction of the recording medium A in Step S5. By repeating a sequential operation of Steps S1 to S5 repeatedly, a desirable information unit in the stream TS is moved to record from the recording medium A to the recording medium B.

(III) Change Operation of the Administration Information

Next, a change operation of the administration information in the administration table T is described in accordance with a flow chart of FIG. 2 and FIGS. 3 to 8.

In Steps S1 and S2 of carrying out a read-out instruction of one information unit from the position P of the stream TS out of the recording medium A, there is no change in the value of reproduction flag F of an administration table T1 which is read-in from the recording medium A, and a mode is similar to the administration table T in FIG. 3.

Figure 4:
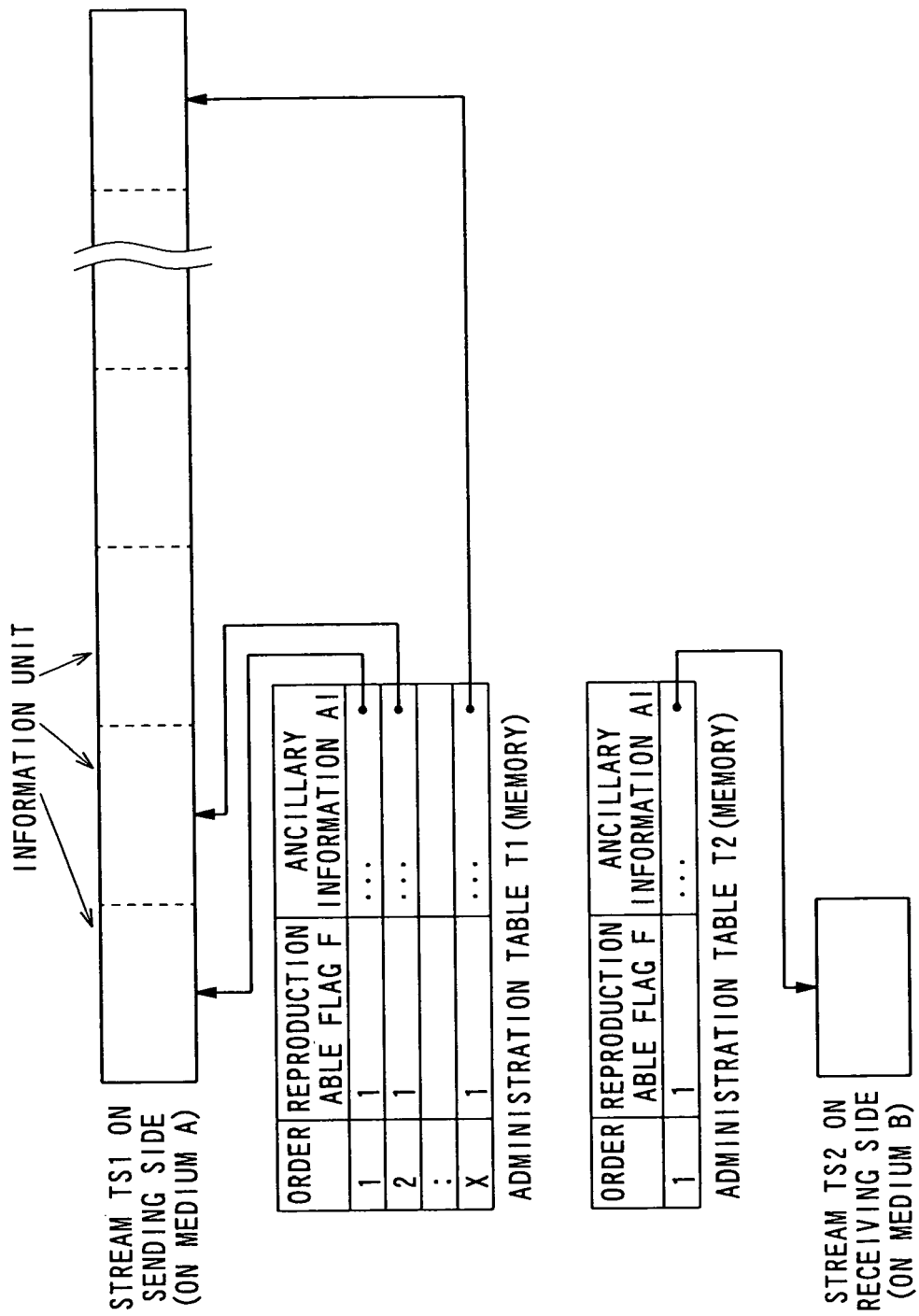
FIG. 4 An explanatory view for showing an administration table and a stream in an operation of changing administration information according to an embodiment of the present invention.
Figure 5:
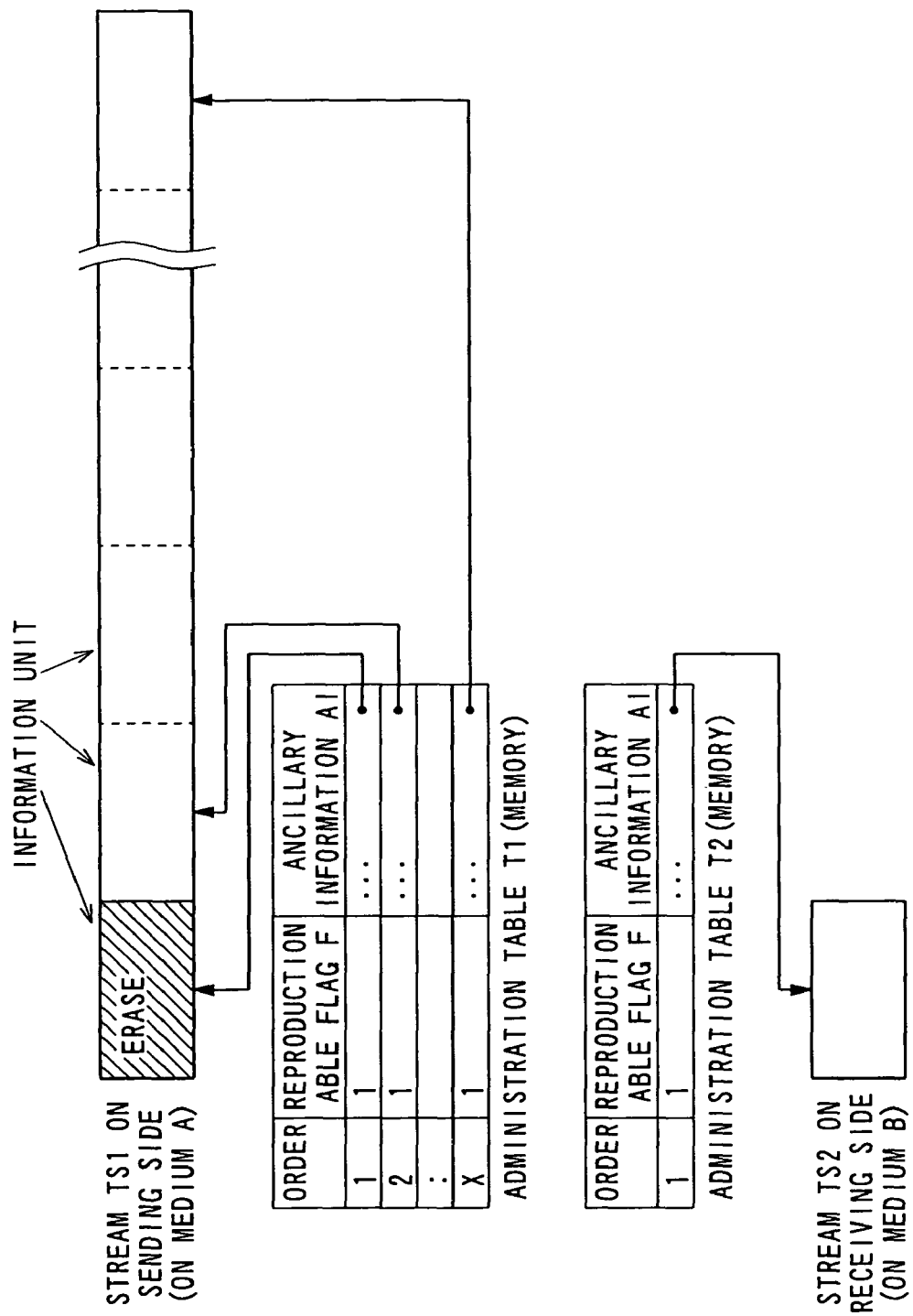
FIG. 5 An explanatory view for showing an administration table and a stream in an operation of changing administration information according to an embodiment of the present invention.

Further, in Step S3 of outputting one information unit (the first (lead) information unit in FIG. 5) corresponding to the position P to the recording medium B from the information recording and reproducing unit 1, in addition to the administration table T1 associated with a stream TS1 (read in from the recording medium A when the move is started) on the memory 3 as shown in FIG. 4, an administration table T2 associated with a stream TS2 on a receiving side of move is prepared, and the stream TS2 including an information unit, subjected to a write instruction from the information recording and reproducing apparatus, is produced. At this point, the value of reproduction able flag F of the administration table T2 is "1". When a new stream TS2 is newly recorded on the recording medium B, a new administration table T2 is newly formed and prepared on the memory 3. When move and record are carried out continuously after the stream TS2, currently existing on the recording medium B, at the time the stream TS2 currently existing is recorded, the administration table T2 is recorded on the recording medium B. Therefore, the administration table T2 on the recording medium B is read in and prepared on the memory 3.

Further, in Step S4 for carrying out operation of deleting N bytes from the position P, namely a write instruction of writing N bytes from the position P of the recording medium A as shown in FIG. 5, the information unit inside the stream TS1 on the sending side, which is read in Step S2, is deleted. An event that the information unit of the stream TS1 on the sending side is deleted results in deletion of data itself which relates to the information unit. (As much, a vacant region may be produced on the recording medium.) Further, although the first information unit in the stream TS is first moved in FIG. 5, the position P for starting the move is not limited to a first portion of the stream TS.

Figure 6:
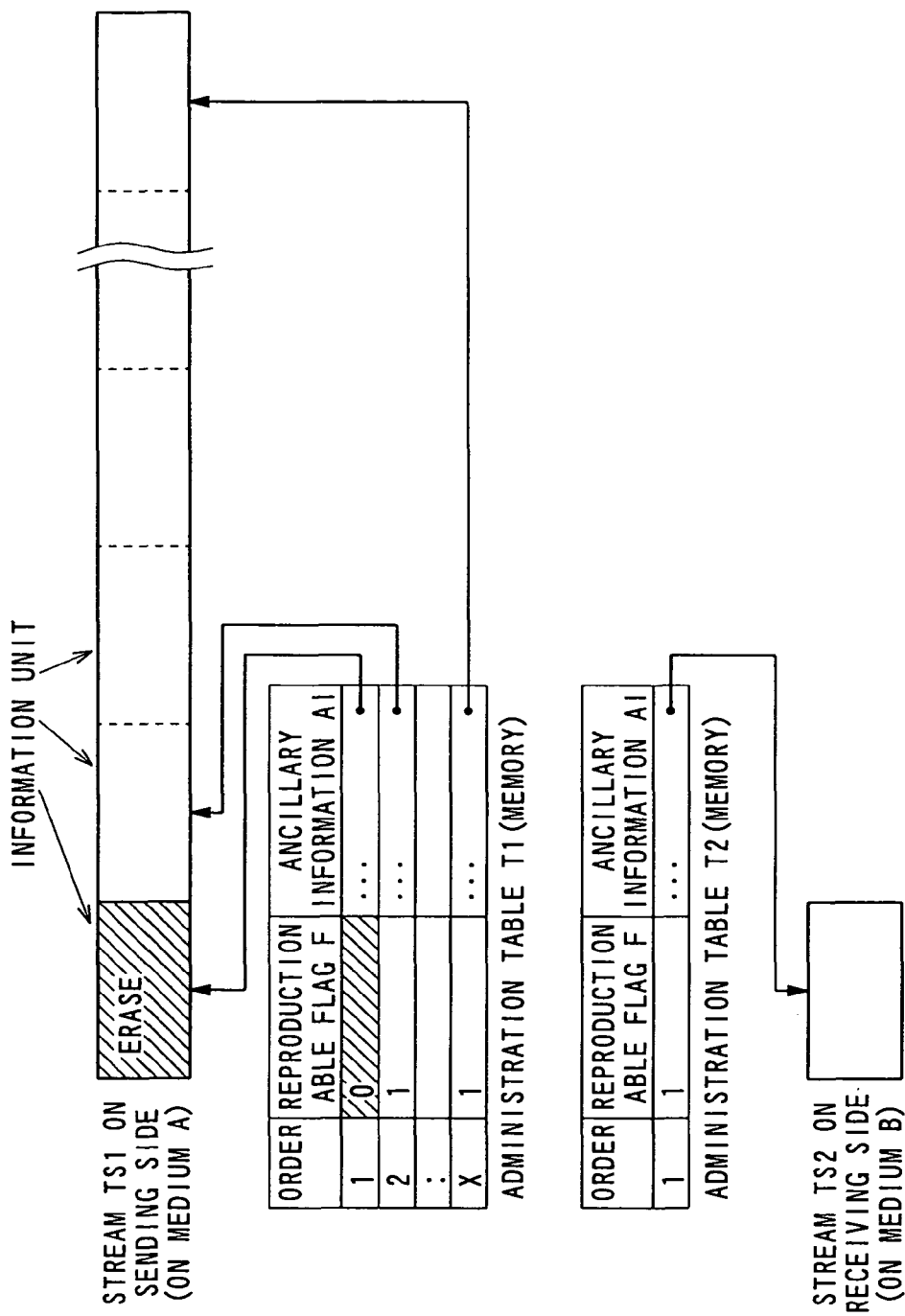
FIG. 6 An explanatory view for showing an administration table and a stream in an operation of changing administration information according to an embodiment of the present invention.

Further, in Step S5 for changing the value of reproduction able flag F of the administration table T1 in the recording medium A so that the information unit corresponding to the position P is in a reproduction disable state, the value of the reproduction able flag F with respect to the information units thus moved is changed from "1" to "0" as shown in FIG. 6.

Figure 7:
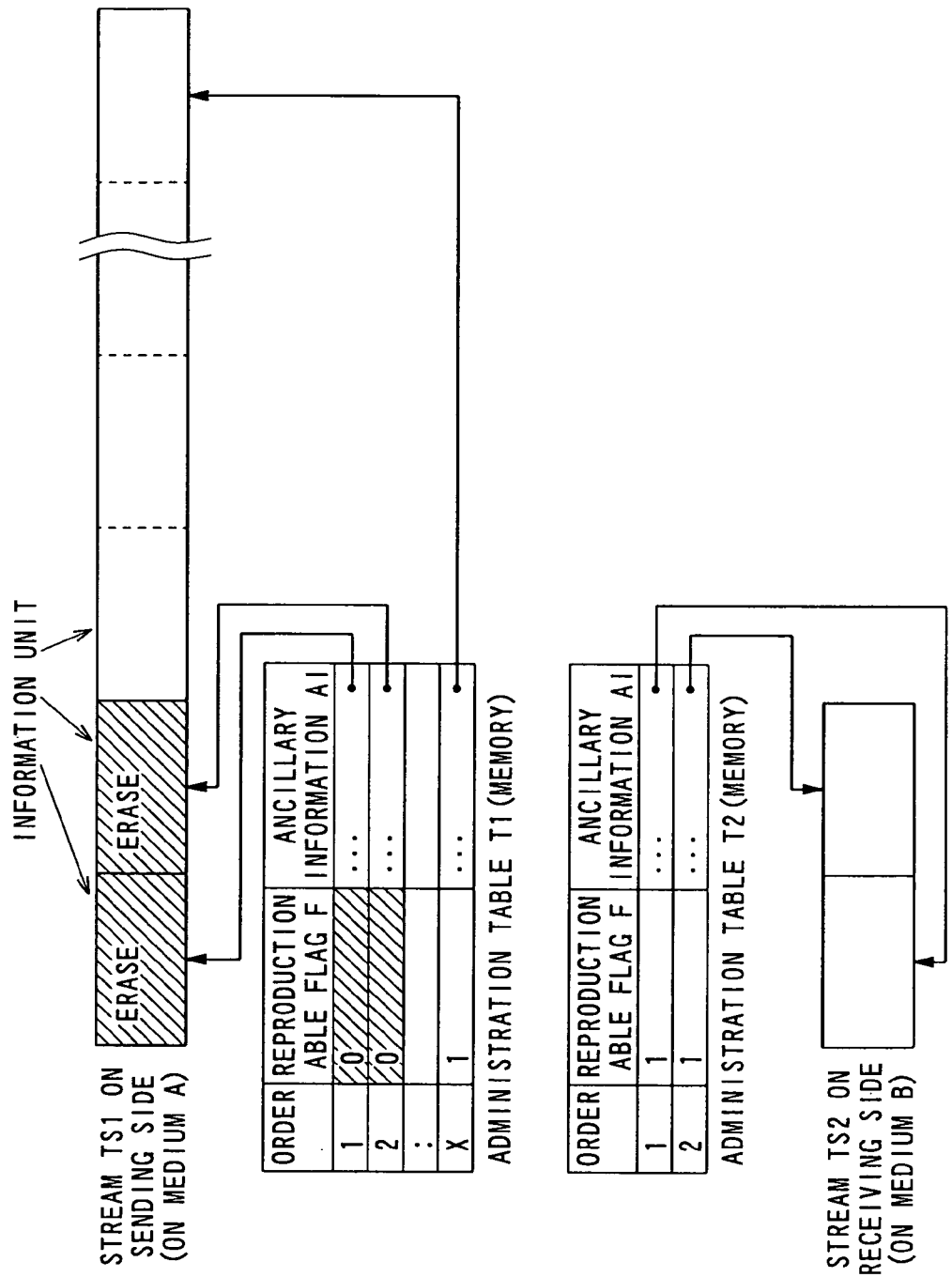
FIG. 7 An explanatory view for showing an administration table and a stream in an operation of changing administration information according to an embodiment of the present invention.
Figure 8:
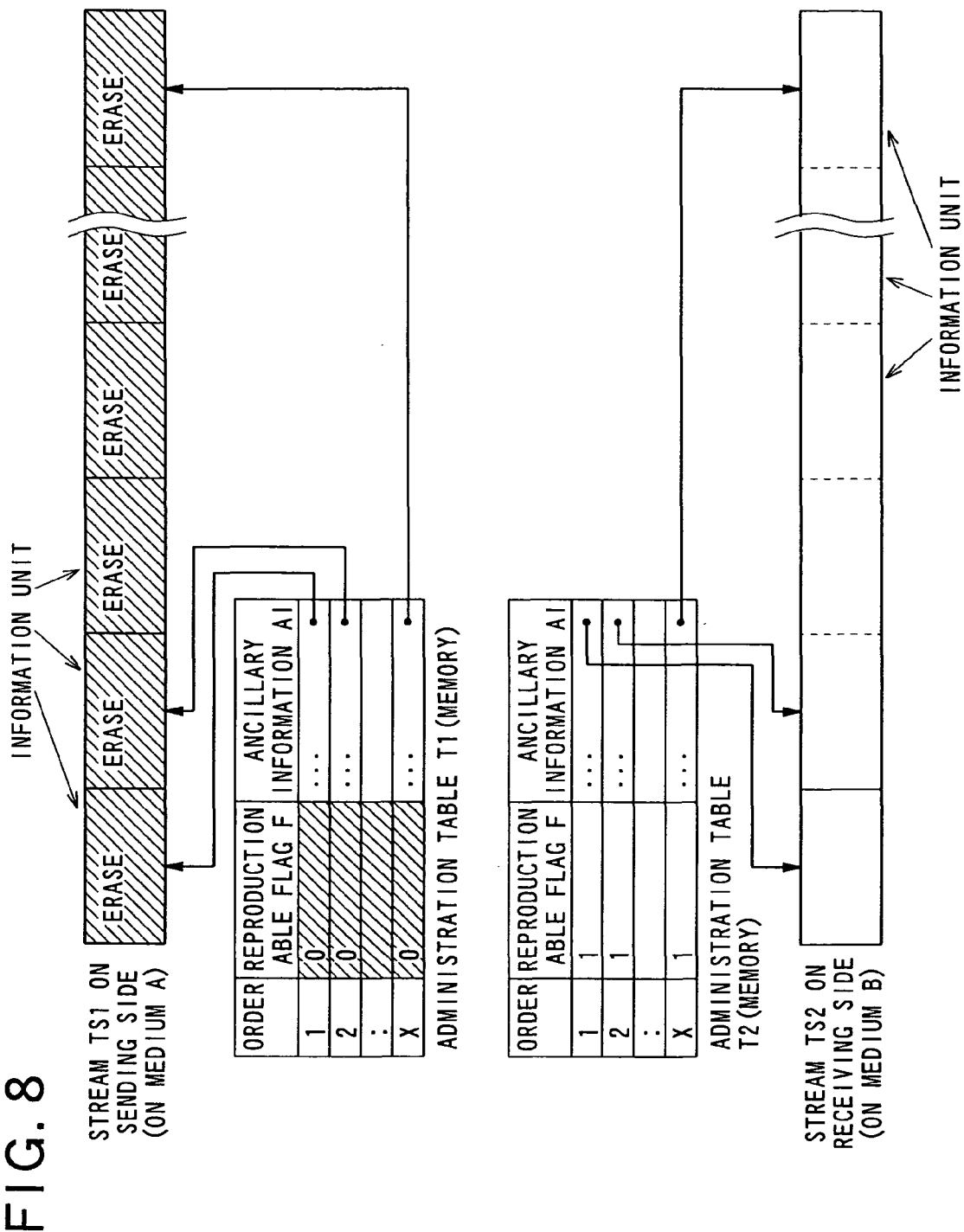
FIG. 8 An explanatory view for showing an administration table and a stream in an operation of changing administration information according to an embodiment of the present invention.

After repeatedly carrying out the processes of Steps S1 to S5, the values of the reproduction able flag F of each of the information units of the administration table T1 and the administration table T2 are respectively changed and set in a sequence of move of the information units (the second information unit in FIG. 7).

After changing the value of the reproduction able flag F of the administration table T1, associated with the stream TS1 on the sending side, from "1" to "0", the information unit of the stream TS1 may be erased. In other words, it is sufficient that the information unit is finally in a state that reproduction is impossible.

By repeating the processes of Steps S1 to S5, the information units up to the X-th order in the administration table T1 of the stream TS1 on the sending side are finally erased, and the values of reproduction able flag F of the information units up to the X-th order in the administration table T1 of the stream TS1 on the sending side are changed from "1" to "0". Furthermore, the stream TS2 on the sending side, which is constituted by the first to X-th information units, is produced, and the value of reproduction able flag F in the administration table T2 of the stream TS2 is set up "1" and recorded onto the recording medium B.

Further, at this point, existence of the administration table T1 associated with the stream TS1 on the sending side becomes meaningless. Therefore, it is possible to delete the administration table T1 when the entire stream TS1 on the sending side is in a state of disabling reproduction.

Further, the order of each of the information units to be recorded on the administration table T2 may be the values of the administration table T1 or new numbers may be allocated thereto. Further, when new numbers are allocated, when for example the stream TS is once moved in mid-course from the recording medium A to the recording medium B, and the remaining streams TS, recorded on the recording medium A, are started to move again, a process of discriminating an order of reproducing each of the information units based on a value of ancillary information AI and reallocating the order recorded on the administration table T occurs.

As such, at the time of move and record, the information recording and reproducing apparatus 1 according to the present embodiment makes the recording medium B record the stream TS, which is recorded in the recording medium A, using the information unit as one move unit, and the value of reproduction able flag F is changed from "1" to "0" so as to indicate that the information unit cannot be reproduced from the recording medium A.

Further, the information recording and reproducing apparatus 1 produces the administration table T2 containing the reproduction able flag F with respect to each of the information units of the stream on the receiving side when the information is moved and recorded. Further, the value of reproduction able flag F is set up "1" to indicate that the information unit can be reproduced.

When one information unit of the stream TS is reproduced for reproduction, the information recording and reproducing apparatus 1 refers to the value of reproduction able flag F corresponding to the information unit, discriminates whether or not the information unit can be reproduced from the recording medium, and when it is discriminated that reproduction is possible, reproduces the recorded information of the information unit.

(IV) Modified Example of Administration Information

Next, a modified example of administration information in the administration table T will be described in reference of FIG. 9.

In general, in order to reproduce the stream TS recorded in the recording medium, data are administrated in units of byte. Specifically, a data position in units of byte is administrated in a stream of picture start code of I (Intra-coded) picture inside GOP (Group of Picture), being one access unit in an MPEG transport stream. Accordingly, an access position for reproducing the I picture on the n-th order is searched, and reproduction is started from the data position, thereby enabling presentation of the recorded information as from a desirable reproducing position to a user.

In the modified example, a case where a stream TS 3 constituted by information units of an undefined length is moved and recorded will be described. In this modification, as shown in FIG. 9, an I picture position administration table T3 associated with the stream TS3 of undefined length has a reproduction able flag F, ancillary information AI indicative of characteristics of the stream TS, and information SI indicative of the access starting position for administrating a byte number from a file top position, recorded in it.

Figure 9:
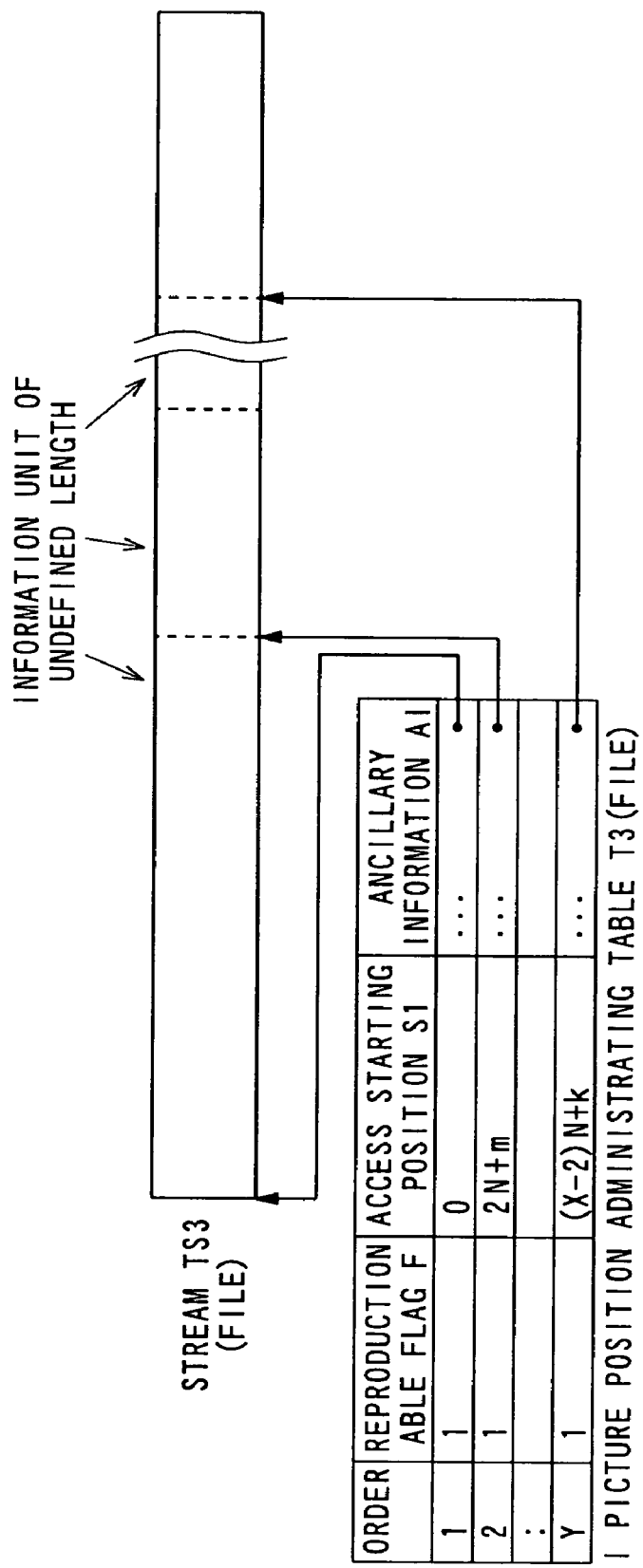
FIG. 9 An explanatory view for showing a modified example of administration information in an administration table.

In FIG. 9, as an example, an access starting position SI of a first information unit is "0", an access starting position SI of a second information unit is "2N+m", and an access starting position SI of a Y-th information unit is "(X−2)N+k".

Such the I picture position administration table T3 is recorded on a recording medium as a file after being associated with the stream TS3 as administration information of the stream TS3. The I picture position administration table T3 is read out of the recording medium A with the CPU 2 and recorded in the memory 3 of the information recording and reproducing apparatus 1 when the CPU 2 of the information recording and reproducing apparatus 1 operates the stream TS3 to be processed.

(V) Modified Example of Administration Information

Further, another modified example of the administration information in the administration table will be described in reference of FIG. 10.

Figure 10:
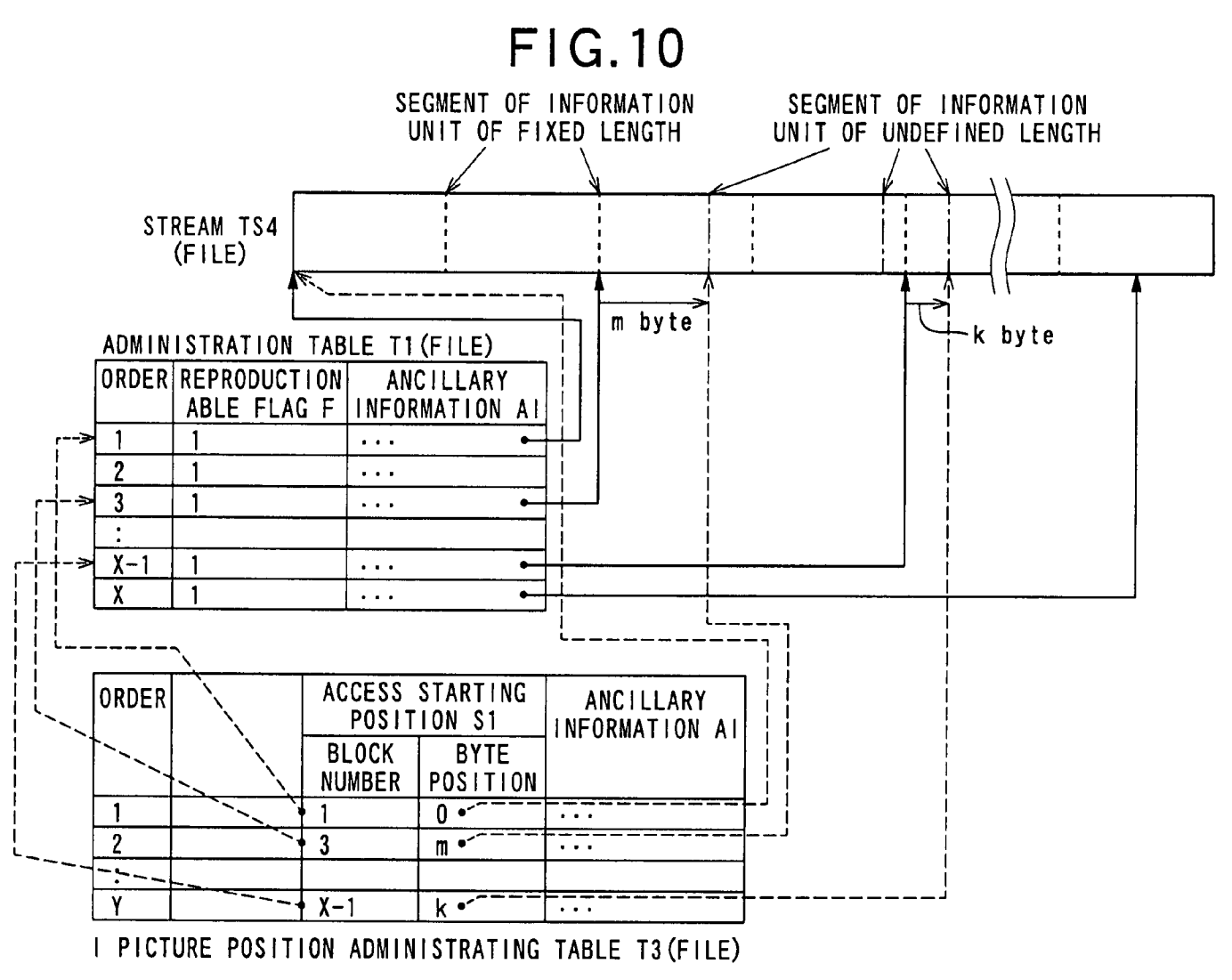

FIG. 10 shows positions of segmenting information units in administrating information units of an undefined length shown in FIG. 9 and information units of a fixed length shown in FIGS. 3 to 8 in a composite manner. In this case, by providing a reproduction able flag F on the basis of any one of the information units of the undefined length and the information units of the fixed length, operations shown in FIGS. 3 to 8 become possible.

Further, as shown in FIG. 10, an access starting position SI in the I picture position administration table T3 is made up of information of a block number and a byte position, a value of block number corresponds to a number of the information unit in the administration table T1, and a value of byte position indicates a distance in bytes between a head address position of the information unit of the undefined length and a head address position of the information unit of the fixed length.

For example, the block number "3" and the byte number "m" of the second information unit of the undefined length in the I picture position administration table T3 mean that a head address of the information unit of the undefined length is positioned at an m-th byte counted from a head of the third information unit after converting it to an information unit of the fixed length. This means that this position corresponds to a second value "2N+m" of the access starting position SI in the I picture position administration table T3 shown in FIG. 9.

(VI) Operation in a Case of Stopping in Mid-Course of Move and Record

Figure 11:
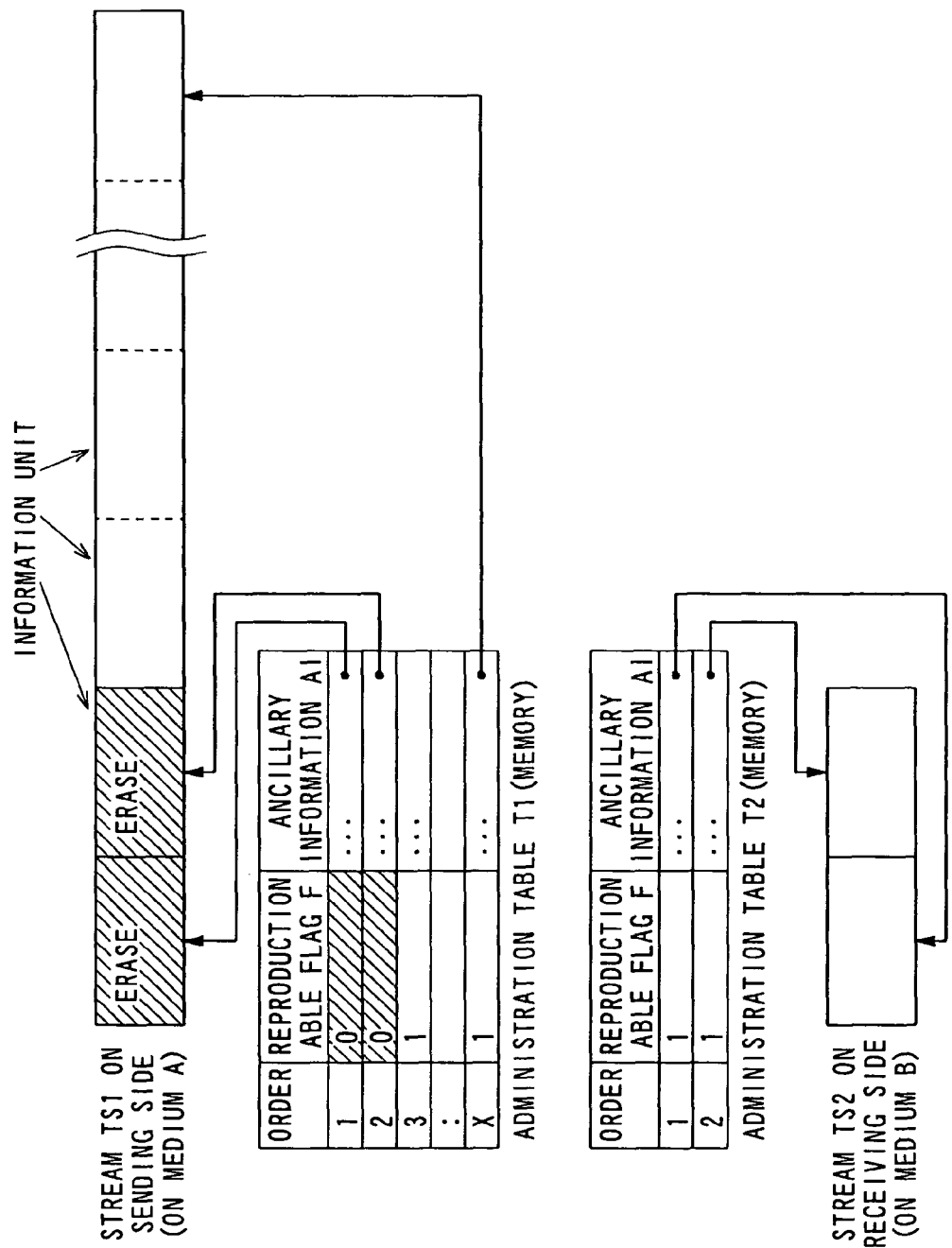
FIG. 11 An explanatory view for showing an administration table and a stream when move and record are stopped in mid-course.
Figure 12:
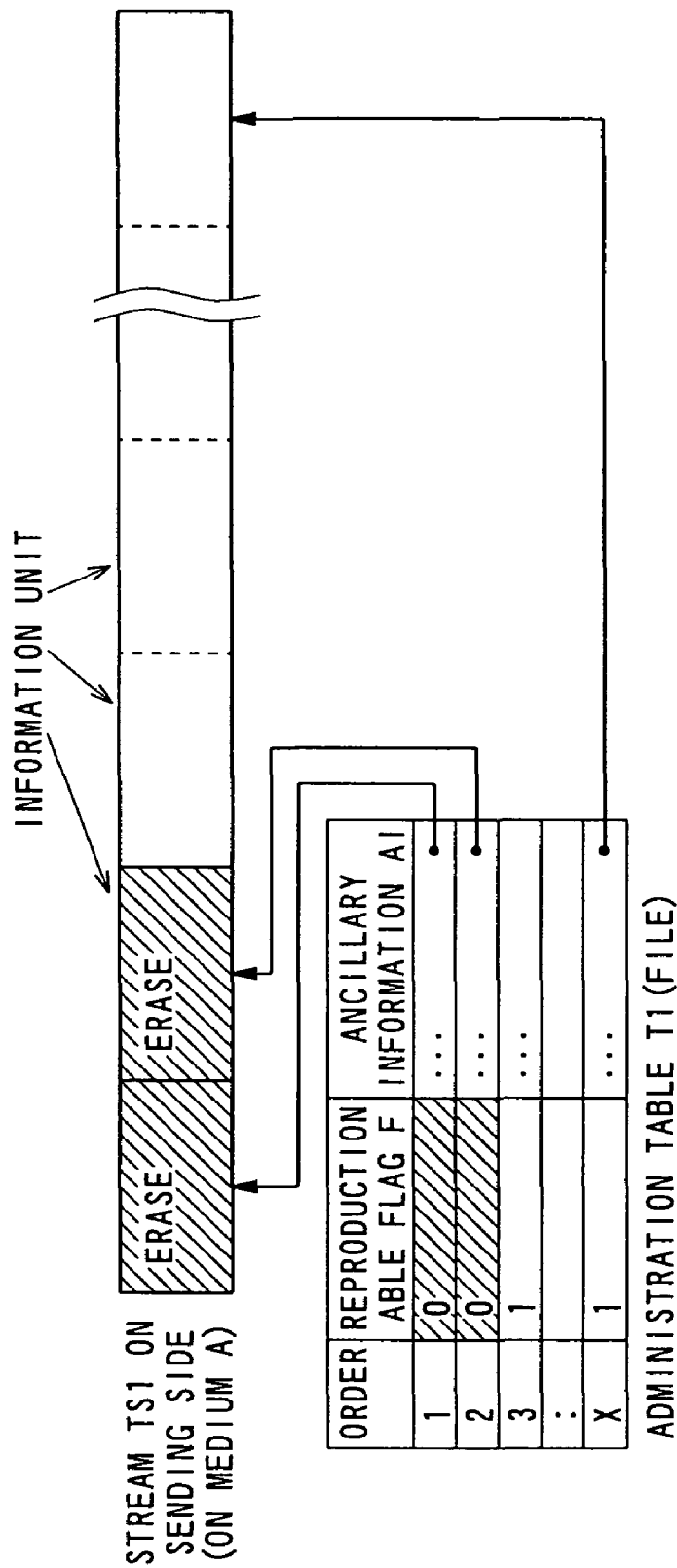
FIG. 12 An explanatory view for showing an administration table and a stream when move and record are stopped in mid-course.
Figure 13:
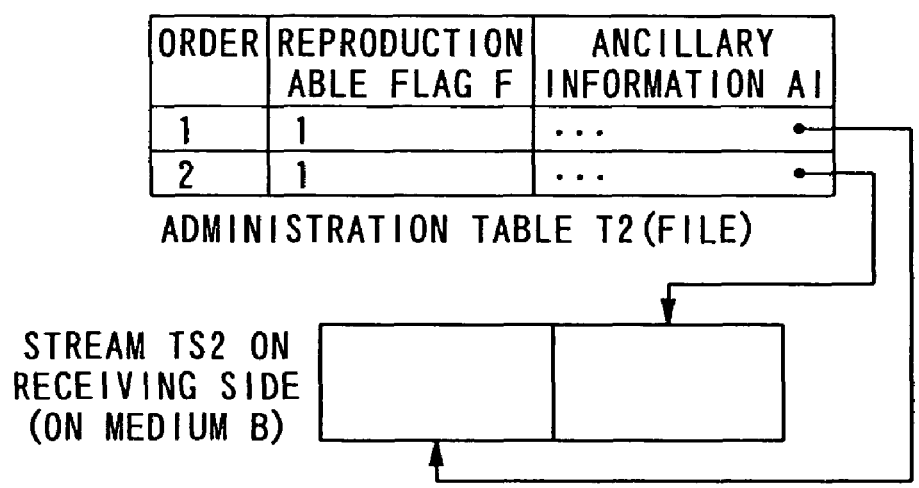
FIG. 13 An explanatory view for showing an administration table when move and record are stopped in mid-course.

Next, an operation of a case where the move and record is stopped in mid-course is described in reference of FIGS. 11 to 13.

In examples shown in FIGS. 11 to 13, a state where the move and record is stopped as an arbitrary action by a user.

For example, the move and record are stopped in the following condition. Namely, after erasing first and second information units of an original stream TS1 as shown in FIG. 11, values of reproduction able flags F corresponding to the first and second information units in the administration table T1 of the stream TS on the sending side are respectively changed from "1" to "0".

At this time, concerning a portion where a value of reproduction flag F on the administration table T1 is "0", such the event is written at a time when the user accesses. The reason of writing the event is in consideration of usage for explicitly notifying that "the data are currently invalid".

Further, according to the information recording and reproducing apparatus 1, by reading the administration table T1 under such the condition, it becomes possible to recognize mid-course of move and record and a restating position for restarting the move and record.

Meanwhile, a stream TS2 of the first and second information units are produced in the recording medium B as shown in FIG. 13.

(VII) User Interface

Figure 14:
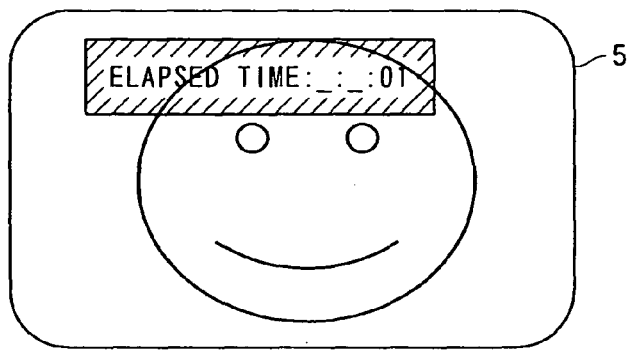
FIG. 14 An explanatory view for showing a user interface when move and record are aborted in mid-course.

Next, a user interface is described in reference of FIG. 14.

As shown in FIG. 14, a user interface having an administration structure shown in FIG. 12 or 13, and provided for notifying a user of recognition of mid-course of move and record, a position thereof, and restart of the move and record will be described.

As described above, when the stream TS of the recording medium A, which is stopped in mid-course of the move and record, since a portion which is moved and recorded (a portion which cannot be reproduced) cannot be reproduced as shown in FIG. 12, the reproduction is started after a lapse of an offset time of one second.

Next, it is instructed to reproduce an information unit positioned at a zero second position in use of time search. Since a value of reproduction able flag F of the information unit is "0" and the information unit which is moved and recorded is tried to be reproduced, it is displayed that "the designated portion is already moved, and cannot be reproduced" on a display unit 5 shown in FIG. 15.

Figure 15:
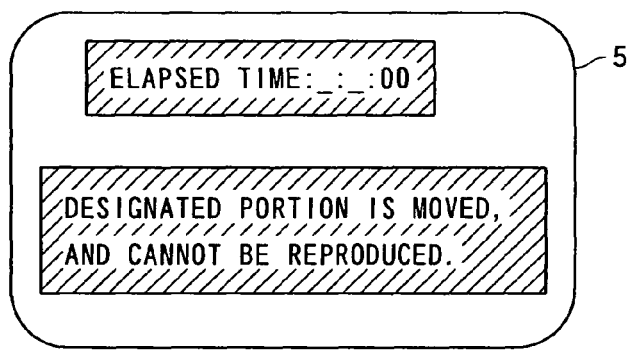
FIG. 15 An explanatory view for showing an user interface when reproduction is impossible.

As such, when the information unit thus moved and recorded is reproduced, it is possible to further surely and easily recognize an extent to which position the stream TS can be reproduced by employing the display of event on the display unit 5 shown in FIG. 15.

(VIII) Modified Example of Administration Table

Figure 16:
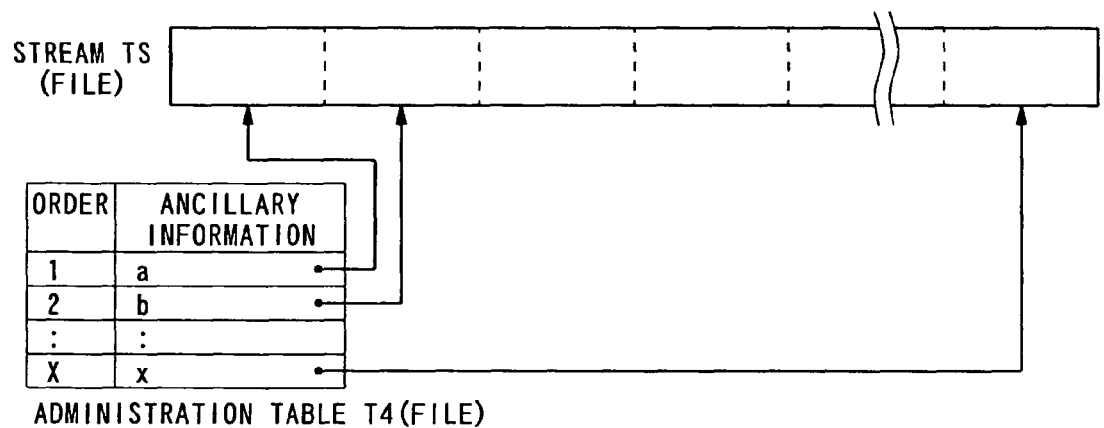
FIG. 16 An explanatory view for showing a modified example of administration table.

In this embodiment, MPEG-TS is made up of a plurality of information units as shown in FIG. 16, and one of the information units is made up of a plurality of TS packets (not shown). In the embodiment, the stream TS is made up of the information units as many as X.

Further, the administration table T4 has a value of ancillary information AI, which can indicate reproduction able and disable information for stipulating at least whether or not reproduction is possible with respect to each of the information units, recorded in it. The ancillary information AI indicates a reproduction disable state when it has a specific value, and indicates a reproduction able state when it has another value. For example, in an ordinary state where reproduction is possible, a value of four bytes is recorded for indicating time data of information unit into the ancillary information AI. When the value is a specific value, specifically FFFFFFFF in hex, it is also indicated that the information unit is in a reproduction disable state.

The CPU 2 constitutes a reproduction able and disable information producing means for producing an administration table T4 in this modified example with respect to each of information units of the stream TS, which is moved and recorded onto the recording medium B.

(IX) Modified Example of Operation of Information Recording and Reproducing Apparatus Next, In accordance with the flowchart shown in FIG. 2 and FIGS. 16 to 19, a change operation of administration information in this modified example is described.

When the administration table T4 shown in FIG. 16 is used, the information recording and reproducing apparatus 1 changes a value of ancillary information AI of the administration table T4, which is associated with a stream on a sending side, to a predetermined value, specifically FFFFFFFF in hex, so that N bytes from a position P in a recording medium A cannot be reproduced in Step S5 of FIG. 2. These sequential operations are repeated until a desirable stream TS is moved from the recording medium A to a recording medium B.

For example, when a first information unit is rendered to be in a state of disabling reproduction from the recording medium A, the value of ancillary information AI in the administration table T4, which is associated with the stream TS on the sending side as shown in FIG. 17, is changed to FFFFFFFF in hex.

Further, after deleting a second information units n the stream on the sending side as shown in FIG. 18, a value of ancillary information AI corresponding to the second information unit recorded in an administration table T5, which is associated with the stream TS on the sending side, is time data of the second information unit. Then as shown in FIG. 18, a stream TS on the sending side is produced by sequentially recorded information units on or after the second information unit, thereby sequentially renewing the administration table T4 and the administration table T5.

For the last time, after erasing the information units up to the X-th order of the stream TS on the sending side as shown in FIG. 19, values of ancillary information of the information units up to the X-th order in the administration table T5 of the stream on the sending side are recorded. Then the stream TS constituted by the information units as many as X, of from the first to the X-th orders, are produced on the recording medium B.

As described above, recorded information (stream TS) constituted by a plurality of information units and the administration table T having the administration information for administrating the recorded information with respect to each of the information units are recorded on the recording mediums A and B according to the present embodiment. Besides the administration information includes the reproduction able flag F for indicating whether reproduction of the information units is possible or not. Therefore, it is possible to surely and easily recognize a position to which the move and record are done. Accordingly, it is possible to further efficiently move and record recorded information, and further efficiently administrate the move and record.

When the move and record are carried out, the information recording and reproducing apparatus 1 reproduces the stream TS recorded on the recording medium A, moves the stream to the recording medium B, and sets up to change the value of reproduction able flag F so as to indicate an event that the information units cannot be reproduced out of the recording medium A. Therefore, it is possible to surely and easily recognize a position to which the stream TS is moved and recorded. Accordingly, it is possible to efficiently administrate the move and record.

Further, at a time of move and record, the information recording and reproducing apparatus 1 sets up the value of reproduction able flag F so as to show an event that the information units can be reproduced out of the recording medium B with respect to each of the information units of the stream, which is moved and recorded onto the recording medium B. Therefore, it is possible to surely and easily recognize a position to which the stream TS is moved and recorded.

Further, at a time of reproduction, the information recording and reproducing apparatus 1 refers to the value of reproduction able flag F corresponding to the information unit, and discriminates whether or not the information unit can be reproduced out of the recording medium A. When it is discriminated that the reproduction is possible, since recorded information of the information unit is reproduced, it is possible to surely and easily recognize a position of the stream TS up to which the stream can be reproduced.

Various modifications are possible with respect to the present invention without being limited by the embodiments described above.

For example, in the above embodiment, a picture signal or the like is obtained by receiving radio waves such as BS digital broadcasting. However, it is also possible to obtain the video signal or the like through radio waves of analogue surface wave TV broadcasting or a server VOD (Video on Demand).

Further, according to the above embodiment, there is described a case where VDR is applied to the recording medium A, and blue ray disc, D-VHS, or DVD-RW is applied to the recording medium B. However, it is also possible to use various recording mediums such as hard disc and flash memory other than these.

Furthermore, a program corresponding to a flowchart shown in FIG. 2 is recorded on an information recording medium such as flexible disc and HD in advance, or recorded after obtaining through a network such as internet. Then the program is read out by, for example, a micro-computer to thereby enable to function it as the CPU 2 or the like according to the embodiment.

The present invention is not confined to the configurations listed in the foregoing embodiments, but it is easily understood that the person skilled in the art can modify such configurations into various other modes, within the scope of the present invention described in the claims.

The entire disclosures of Japanese Patent Applications No. 2004-210634 filed on Jul. 16, 2004 including the specification, claims, drawings and summary are incorporated herein by reference in its entirety.

The invention claimed is:

1. An information record controlling apparatus that administrates and controls recorded information constituted by a plurality of information units, the information record controlling apparatus comprising:
 a control device that controls move and record of the recorded information with respect to each of the information units on the basis of reproduction able and disable information, which stipulates whether or not reproduction is possible at an access starting position to an I (Intra-coded) picture constituting the recorded information, the reproduction able and disable information is stipulated with respect to each of the information units, the control device administrates a position of the information unit in the recorded information and the access starting position to the I picture so that the position is associated with the access starting position, a move controlling device that obtains the recorded information recorded on a first recording medium with respect to each of the information units, and makes the recording information record on a second recording medium with respect to each of the information units; and a reproduction disable setting device that sets up information indicating that the information units cannot be reproduced out of the first recording medium with respect to each of the information units of the recorded information, recorded on the second recording medium, wherein, the reproduction disable setting device sets up disable information on the reproduction able and disable information of the each of the information units in the first recording medium every after the each of the information units is recorded on the second recording medium.

2. The information reproduction controlling apparatus according to claim 1, further comprising:

a reproduction able and disable information producing device that sets up information indicating that the recorded information, recorded on the second recording medium, can be reproduced with respect to each of the information units of the recorded information, and produces the reproduction able and disable information.

3. The information reproduction controlling apparatus according to claim 1, wherein the information unit has a fixed data length or an undefined length.

4. An information reproduction controlling apparatus that administrates and controls recorded information, constituted by a plurality of information units, and controls reproduction of the recorded information, carried out with respect to each of the information units on the basis of reproduction able and disable information which stipulates whether or not reproduction is possible at an access starting position to an I (Intra-coded) picture constituting the recorded information, comprising:

a discrimination device that refers to the reproduction enable and disable information when the recorded information, recorded on the first recording medium, is reproduced, and discriminates whether or not the information units can be reproduced from a first recording medium with respect to each of the information units; and a reproduction controlling device that obtains and reproduces the information units when it is discriminated that the reproduction is possible, wherein, a reproduction disable setting device sets up disable information on the reproduction able and disable information of the each of the information units in the first recording medium every after the each of the information units is recorded on the second recording medium.

5. The information reproduction controlling apparatus according to claim 4, wherein the information unit has a fixed data length or an undefined length.

6. A non-transitory information recording medium comprising:

a recorded information region for recording recorded information constituted by a plurality of information units, and an administration information region for recording reproduction able and disable information, which stipulates whether or not the reproduction is possible at an access starting position to an I (Intra-coded) picture constituting the recorded information, wherein, a reproduction disable setting device sets up disable information on the reproduction able and disable information of the each of the information units in the first recording medium every after the each of the information units is recorded on the second recording medium.

7. The non-transitory information recording medium according to claim 6, wherein the information unit has a fixed data length or an undefined length.

8. An information record controlling method for controlling and administrating recorded information, constituted by a plurality of information units, and controlling move and record of the recorded information with respect to each of the information recording units on the basis of reproduction able and disable information for stipulating whether or not reproduction is possible at an access starting position to an I (Intra-coded) picture constituting the recorded information, comprising:

a move controlling step of obtaining the recorded information, recorded on a first recording medium, with respect to each of the information units, and making the recorded information record on a second recording medium with respect to each of the information units; and a reproduction disable setting step for setting up information, indicating that the information unit cannot be reproduced from the first recording medium, with respect to each of the information units of the recorded information of the second recording medium, wherein, in the reproduction disable setting step, disable information is set up on the reproduction able and disable information of the each of the information units in the first recording medium every after the each of the information units is recorded on the second recording medium.

9. A reproduction controlling method for administrating and controlling recorded information, constituted by a plurality of information units, and controlling reproduction of the recorded information, carried out with respect to each of the information units on the basis of reproduction able and disable information for stipulating whether or not reproduction is possible at an access starting position to an I (Intra-coded) picture constituting the recorded information, comprising:

a discrimination step of referring to the reproduction able and disable information when the recorded information, recorded on a first recording medium is reproduced, and discriminating whether or not the information unit can be reproduced from the first recording medium with respect to each of the information units; and a reproduction control step of obtaining and reproducing the information units when it is discriminated by the discrimination means that the reproduction is possible, wherein, a reproduction disable setting device sets up disable information on the reproduction able and disable information of the each of the information units in the first recording medium every after the each of the information units is recorded on the second recording medium.

* * * * *